UNITED STATES PATENT OFFICE.

SAMUEL LEWIS SUMMERS, OF PHILADELPHIA, PENNSYLVANIA.

ALKALI CAFFEINE METHYLENE DISALICYLATE.

SPECIFICATION forming part of Letters Patent No. 721,923, dated March 3, 1903.

Application filed July 26, 1902. Serial No. 117,215. (No specimens.)

*To all whom it may concern:*

Be it known that I, SAMUEL LEWIS SUMMERS, a citizen of the United States, residing in the city of Philadelphia, State of Pennsylvania, have invented certain new and useful Caffeine Methylene Disalicylates of the Alkalies, of which the following is a full, clear, and exact description.

My invention relates to the production of a new chemical compound resulting from the combination of the alkaloid caffeine with any one of the four alkali salts of methylene disalicylic acid, and it finds its chief utility as a pharmaceutical product for its therapeutic value and is especially adapted to subcutaneous use by reason of its rapid and complete solubility in a small amount of water.

In Letters Patent dated August 5, 1902, No. 706,354, issued to me, I described the methylene disalicylic acid discovered by me, and in an application filed June 14, 1902, Serial No. 111,731, I described my discovery of the alkali salts of that acid.

My present invention consists in combining the alkaloid caffeine with any one of the aforesaid alkali salts of methylene disalicylic acid in the class of alkali salts thereof described in said pending application, Serial No. 111,731, and the result is not a mere admixture, as might at first be supposed when theoretically considered, but is a true chemical combination, easily proven to be such by the fact that the caffeine present in my new compound invented dissolves in a very much smaller quantity of water than would otherwise be required to dissolve isolated caffeine crystals.

In carrying out my process practically I take three hundred and two (302) parts, by weight, of the aforesaid lithium salt of methylene disalicylic acid dissolved in about one thousand (1,000) parts, by weight, of water, heat it to boiling, and add 401.2 parts, by weight, of pure crystalline caffeine. The latter dissolves readily and combines with the lithium methylene disalicylate and on evaporation to dryness separates out in whitish crusts of microscopic crystalline form.

The new compound is peculiar in being an addition product of the alkaloid caffeine and the aforesaid salt used to form the compound. Besides being very quickly and completely soluble in water, (even in the cold,) it is moderately soluble in alcohol, but insoluble in ether and benzene. It is more or less deliquescent. It has the formula $C_{15}H_{10}O_6(2R')C_8H_{10}N_4O_2$, in which $2R'$ represents two molecules of a monovalent alkali salt of the class referred to, which includes, besides the lithium salt, the sodium salt, (of which, if substituted, three hundred and thirty-two parts, by weight, should be used,) the potassium salt, (of which three hundred and sixty-four parts, by weight, should be used,) and the ammonium salt, (of which three hundred and twenty-two parts, by weight, should be used.)

Having thus described my invention, what I claim as new, and desire to secure by Letters Patent, is—

The crystalline product described, which is derived from heating an aqueous solution of an alkali salt of methylene disalicylic acid with the alkaloid caffeine, and evaporating it to dryness, said product forming in crusts of minute crystalline structure, substantially white in color, somewhat deliquescent, quickly and completely soluble in water, even in the cold, moderately so in alcohol, insoluble in ether and benzene, and having the formula $C_{15}H_{10}O_6(2R')C_8H_{10}N_4O_2$.

In testimony whereof I have hereunto affixed my signature this 24th day of July, A. D. 1902.

SAMUEL LEWIS SUMMERS.

Witnesses:
CHARLES H. THOMPSON,
GEO. W. REED.